Figure 5:
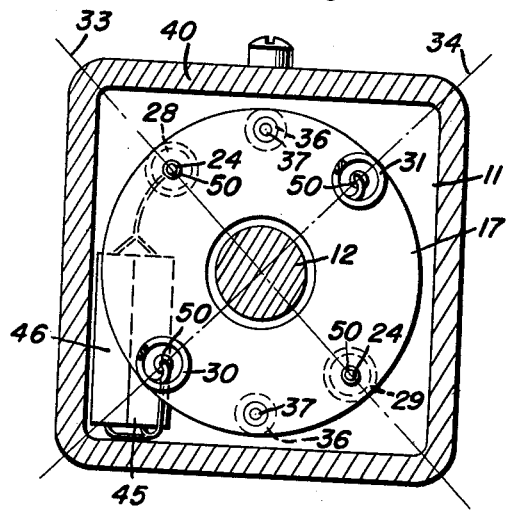

Jan. 29, 1963
R. A. RIECKMAN ET AL
3,076,153
ELECTROMOTIVE VIBRATOR AND OSCILLATOR SYSTEM
Filed Jan. 14, 1960
2 Sheets-Sheet 1
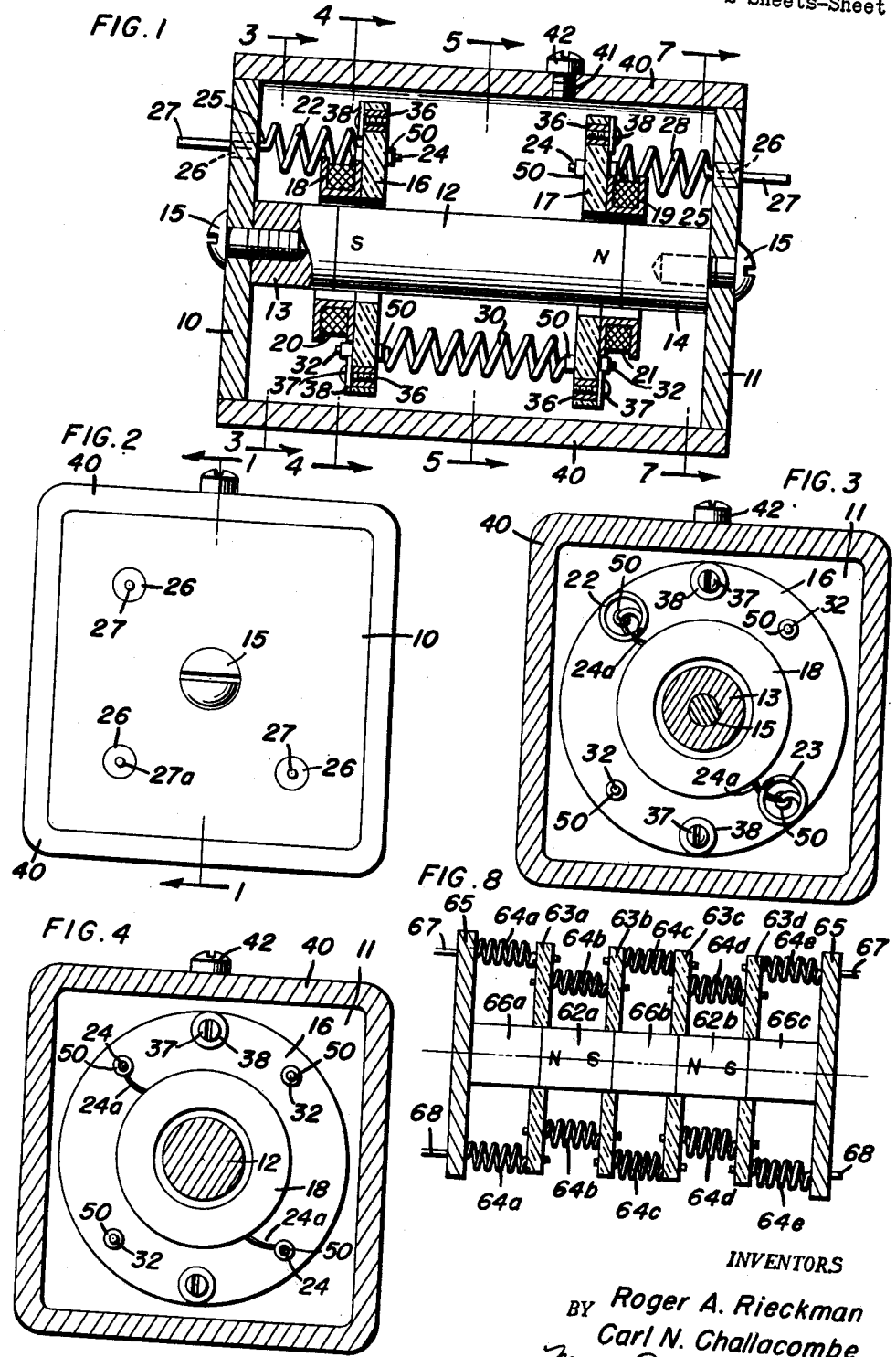
INVENTORS
Roger A. Rieckman
Carl N. Challacombe
BY Mason, Porter, Diller & Stewart
ATTORNEYS Jan. 29, 1963 R. A. RIECKMAN ET AL 3,076,153
ELECTROMOTIVE VIBRATOR AND OSCILLATOR SYSTEM
Filed Jan. 14, 1960
2 Sheets-Sheet 2

INVENTORS
BY Roger A. Rieckman
Carl N. Challacombe
Mason, Porter, Diller & Stewart,
ATTORNEYS United States Patent Office 3,076,153
Patented Jan. 29, 1963

3,076,153
ELECTROMOTIVE VIBRATOR AND OSCILLATOR SYSTEM
Roger A. Rieckman and Carl N. Challacombe, Elgin, Ill., assignors to Elgin National Watch Company, Elgin, Ill., a corporation of Illinois
Filed Jan. 14, 1960, Ser. No. 2,377
16 Claims. (Cl. 331—116)

This invention relates to a system in which coil spring means are established in longitudinal oscillation whereby electrical coil means are moved relative to a magnet and electrical impulses are generated therein, wherewith such impulses can be amplified and therefrom electrical effects returned in proper phase for maintaining the oscillations.

An object of the invention is the provision of a device having one or more pairs of essentially identical and oppositely moving masses including coils moving in magnetic fields having different magnetic strengths along the path of movement, and spring means located outside the major path of magnetic flux and being connected to and between the masses for supporting the same and cooperative with the masses for determining the rate of mechanical vibration and preserving temperature compensation properties of the springs.

Another object is the provision of a device having a magnet with oppositely movable rings therearound, each ring supporting a respective electrical coil in close physical position relative to the magnet for movement in the magnetic field, and independent springs connecting the rings to one another and connecting each ring to a support associated with the magnet.

A further object is the provision of a device having oppositely movable rings each connected by end coil springs to spaced supports, each ring having an electrical coil mounted thereon for moving in a magnetic field, and intermediate coil springs connecting the rings, the ends of the said intermediate springs being connected to the rings at points spaced peripherally from the connections of said end springs thereto for evening effect in balancing the spring forces.

A further object is the provision of a device having oppositely moving rings each connected by a pair of electrically conductive coil springs to spaced supports with such springs electrically insulated from one another, each ring having an electrical coil mounted thereon for moving in a magnetic field, intermediate coil springs connecting the rings, and electrical connections from each coil to the adjacent electrically conductive springs at points thereof immovable relative to the respective associated ring.

A further object is the provision of a device having a number of pairs of oppositely movable masses connected together in series and to end supports by a coil spring system which can be operated at a high mode of mechanical vibration, e.g., with a number of full waves equal to the number of pairs of masses, and with electrical coils providing parts of the mass for connection in circuit and cooperation with magnets so that electrical currents are generated for external employment and for return in selected phase relation to maintain the vibration.

A further object is the provision of a vibratory system having masses and springs for determining the rate of vibration thereof, with means for adjusting the masses, and with an electrical coil forming a part of a mass and cooperative with a magnet for coaction therewith.

Figure 7:
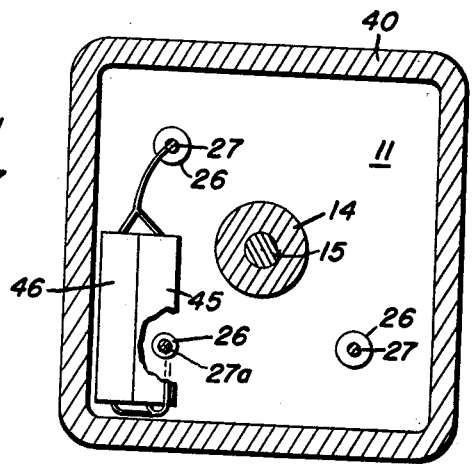
Figure 6:
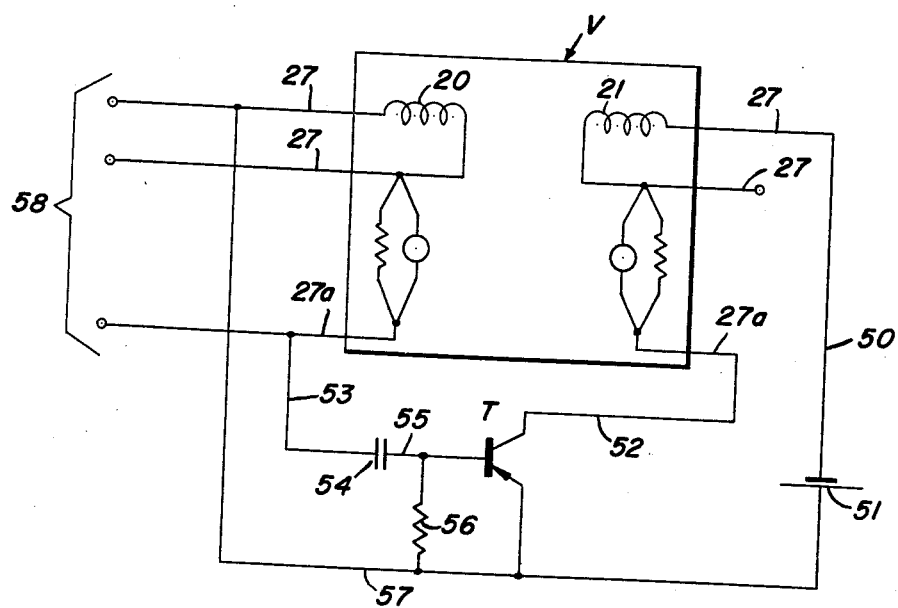

With these and other objects in view, an illustrative embodiment is shown on the accompanying drawing, in which:

FIGURE 1 is a diametrical sectional view, substantially on line 1—1 of FIGURE 2, of a device according to this invention;

FIGURE 2 is an end elevation;
FIGURE 3 is an upright section, substantially on line 3—3 of FIGURE 1;
FIGURE 4 is an upright sectional view, substantially on line 4—4 of FIGURE 1;
FIGURE 5 is an upright sectional view, substantially on line 5—5 of FIGURE 1;
FIGURE 6 is a circuit diagram showing the connection of the device for delivering and receiving electrical impulses;
FIGURE 7 is an upright section substantially on line 7—7 of FIGURE 1;
FIGURE 8 is a conventionalized view, corresponding to FIGURE 1, showing the employment of multiple systems for attaining higher modes of vibration.

In the drawings, metal end pieces 10, 11 are held apart by a centrally positioned permanent magnet 12 and the coaxial spacers 13, 14 which are of non-magnetizable material such as brass. The magnet 12 and spacers 13, 14 are preferably rigidly connected by cement or brazed joints. The screws 15 pass through the end pieces 10, 11 and engage the spacers 13, 14.

Two rings 16, 17 of non-magnetizable material are positioned for freedom of movement axially along the magnet and spacer assembly. They preferably are of insulating material to avoid eddy current effects therein. Connected to each ring is a spool 18, 19 having an electrical winding 20, 21 therein.

Two coil springs 22, 23 have axially extending ends 24 which are received and fixedly secured in the ring 16, at diametrically opposite points thereof. The other ends 25 of these coil springs pass through insulator plugs 26 in the end pieces 10, and project to the exterior as terminals 27, FIGURES 1 and 2, to which electrical connections may be made. Two coil springs 28, 29 are likewise connected to the end piece 11 and the ring 17. The springs 22, 28 and 23, 29 are respectively aligned parallel to the axis of the magnet 12. The springs 22, 23, 28, 29 are herein referred to as end spring means.

Two coil springs 30, 31 have axially extending ends 32 which are secured in the rings 16, 17. The diametrical plane 33, FIGURE 5, passing through the ends of the springs 22, 23, 28, 29 is illustratively at angles of 90 degrees from the diametrical plane 34 passing through the ends of the springs 30, 31. The springs 30, 31 are herein referred to as intermediate spring means.

The springs 22, 23, 28, 29 are insulated from one another and from the end pieces 10, 11. The flexible conductor ends 24a of the coils 20, 21 are respectively brought to the inner ends 24 of these springs and soldered thereto so that separate external terminals 27 permit conduction to and from the coils. The ends 24 move with the rings 16, 17 so that no stress is applied to the inner connections during coil oscillation; and the ends 25, 27 are similarly fixed to and without movement relative to the end pieces 10, 11.

The springs 30, 31 should each have a movement of compression or stretching, under a given load, which is twice that of a spring 22, 23, 28, 29. Thus, when the springs are made of the same wire with the same coil diameter and spacing, springs 30, 31 have twice the number of turns as the springs 22, 23, 28, 29. In assembling, the several springs are placed under slight tension prior to having their ends fixed in position, so that the assemblies of rings 16, 17, with their respective coils 20, 21 are held free of friction against the magnet assembly: and the coils 21, 21 are located around the respective ends of the magnet 12, shown as the south (S) and north (N) poles in FIGURE 1. Further, the rings are positioned, upon securing, parallel to one another and with their planes at right angles to the general axis. The structure is essentially symmetrical about a radial plane through the center of length of the magnet 12: and the rings can act as eveners or load distributors, so that the pulls of each of the springs 30, 31 are equally distributed to the end springs 22, 23, 28, 29.

The rings 16, 17 preferably have threaded plugs 36 to receive small screws 37 for binding mass-adjusting washers 38 in position thereon. When proper mass weights are established for given springs and a specified frequency, the individual mass of a subassembly of ring and coil can be determined, and tared washers 38 added to increase such mass to the standardized value for initial calibration.

A gas-tight casing 40 may be placed around the end pieces 10, 11 and secured thereto. The end pieces are illustratively sealed by having the insulators 26 of glass and hermetically sealing the same thereto, and upon the conductors 27 for mechanical fixing the parts together; and solder may be employed to fix the screws 15 and prevent leakage thereat. An opening 41 may be provided in the casing so that its interior may be evacuated, or filled with a dry gas, e.g., nitrogen, at a desired pressure: with the opening then being closed by a plug 42 which may be sealed in place.

A preferred method of assembly is to cement the wound coil bobbins 18, 19 to the rings 16, 17. The rings are then held in a fixture to maintain the desired spacing. The springs 22, 23, 28, 29, 30, 31 have their axially projecting ends introduced into the apertures of the rings, and are secured by soldering or welding. The subassembly of rings and springs is then passed over the magnet assembly, and the end pieces 10, 11 positioned and connected to the magnet assembly and to the outer ends of the end springs 22, 23, 28, 29 in like fashion, with the spring assemblies under initial tension.

A temperature sensitive resistor 45 such as a thermistor of 500 ohms with a shunt resistance 46 of 680 ohms may be connected in series with each coil 20, 21 and located within the casing: the other common terminal of the thermistor-resistor group being connected to a terminal 27a at the respective end piece 10, 11, with sealing insulation 26. Such arrangement provides a more uniform voltage output level upon change of ambient temperature: but is not required where the variation range is small or other means of stabilizing the temperature of the device is employed.

An illustrative device for operation at 400 cycles per second has a cylindrical magnet 12 of Alnico V, with a flux density of 7 to 8 kilogauss at the center of the magnet: being 0.170 inch in diameter and 0.860 inch long. The electrical coils 20, 21 are of insulated No. 48 AWG copper wire, 0.08 inch wide, with inner and outer diameters, respectively 0.224 and 0.300 inch; and a resistance of 750 ohms. The bobbins 18, 19 for the coil are of a shaped insulating plastic known commercially under the trademark Rexolite, being 0.100 inch wide, with inner and outer diameters, respectively, 0.210 and 0.308 inch; and were wound with the wire before assembly. The end supports 10, 11 are of brass, 0.66 by 0.66 inch and 0.050 inch thick, with hermetically sealed terminals therein. The springs 22, 23, 28, 29, 30, 31 are of Ni-Span alloy wire 0.016 inch in diameter wound to an external coil diameter of 0.150 inch: the end springs 22, 23, 28, 29 had four turns each, the intermediate springs 30, 31 had eight turns. The insulating rings 16, 17 are of glass about 0.520 inch external and about 0.230 inch internal diameter, and about 0.05 inch thick; with four (so-called Kovar) tubes 50 fused with the glass at 90 degree spacing at about 0.210 inch radius from the center, the tubes being 0.020 and 0.040 inch in internal and external diameter and projecting about 0.075 inch from each face. The casing 40 was of mild steel (known as 1010), 1.70 inches long and $^{45}/_{64}$ inch square, with rounded edges as shown.

The parts were assembled. Upon test, the structure was within 3 or 4 cycles of the intended frequency. Weights were added or subtracted, by changing the washers 38 for heavier or lighter ones normally with the desired weight change being effected one-half at each of the pair of washers on a given ring 16, 17, to change the mass effects for bringing the frequency within 0.2 cycle of that specified. The assembly is connected in circuit and operated at high amplitude for several days, shifting every two or three hours from a temperature of minus 65 degrees C. to one of 100 degrees C., and vice versa. After this artificial aging, the frequency is again adjusted by changing the weights, and the assembly is further operated for several days at room temperature. Final adjusting may then be made, if necessary. The end pieces 10, 11 are then soldered in place and thereby sealed; the casing is evacuated and re-filled with dry nitrogen by the opening 40; the plug 41 is inserted and sealed by soldering. The individual accuracy is within 0.05 cycle for a group of such assemblies.

In practice, the casing 40 has little or no effect upon the frequency of the assembly as such: but is effective for maintaining a uniform atmospheric condition, and to eliminate undesired electrical and magnetic disturbances from the exterior.

The device of FIGURES 1 to 5 may be connected in a circuit, as shown in FIGURE 6. Here the device V with its four terminals 27 is connected for use with a transistor T. One terminal for the coil 21 is connected by a conductor 50 with a battery 51. The other terminal of the coil 21 is connected by a conductor 52 to an electrode of the transistor T. One terminal of the coil 20 is connected by a conductor 53 to a condenser 54 which at its other terminal is connected by a conductor 55 to the base of the transistor T and to a resistor 56. A common conductor 57 connects the other battery terminal, the other transistor electrode, the other terminal of resistor 56, and the other terminal of the coil 20. The terminals of coil 21 are shown as also connected to pulse output terminals 58, from which alternating current can be led to a device to be energized thereby.

The illustrated device will operate under either half-wave or full wave condition, depending upon the polarity of the current fed back to the coil 21. It is preferred to operate under full wave conditions, as then the opposite movements of the masses compensate one another and there is no external force exerted by the unit as a whole.

For full wave condition, the connections of the coils 20 and 21 are so made that a rightward, for example, movement of the coil 20 will cause generation of a current pulse therein which upon amplification, with due account taken of phase changes at the amplifier, can be fed back to the coil 21 to produce a leftward movement thereof. Therewith, the intermediate springs 30, 31 contract, and the end springs 22, 23, 28, 29 are tensed; until the spring tensions bring the masses, including the coils, to rest. When the coil 20 is no longer moving, no current is being generated therein, and no feed-back pulse flows to the coil 21. The springs then act to cause the coils to move back, coil 20 in this illustration moving to the left and coil 21 to the right. Current is again generated in the coil 20 but in the opposite direction; and an oppositely directed pulse is fed to the coil 21 to increase the force moving it toward the right: wherewith the springs 30, 31 are elastically stretched and the end springs 22, 23, 28, 29 are permitted to contract until a new balance is established: whereupon the coils again reverse direction of travel. Thus, there is harmonic alternation of energy effects between kinetic and potential states, and the feed-back current maintains the action.

By reversal of the connections to coil 20, for example, a half-wave condition is established, in which the coils move simultaneously in the same direction. With the full-wave connection, the feed-back current acts to prevent half-wave vibrations; and conversely, with the half-wave connection, the feed-back current damps full-wave vibrations.

The actual distance of coil movement is very small in the illustrative example, but the external current form at the terminals 58, as observed by an oscilloscope, is a harmonic of maintained amplitude, after the device has run for a fifth to a half second. The circuit shown operates without the condenser, but the waveform is purer with it present due to restriction of extraneous oscillation effects.

The frequency of this current is determined by the elasticity effects of the spring system in moving the masses provided by the rings, coils and springs: that is, the frequency is determined by the mechanical constants of the apparatus. The electrical circuit constants are chosen so that the electrical amplification is not highly selective or critical as to frequency. Therewith, a device having coil impedances of 750 to 1,000 ohms can generate alternating current voltages of the order of 0.1 to 0.4 volts at the circuit terminals 58; and establish an impedance change, from a resonant to a non-resonant condition, of the order of 5 to 1 or more, with a Q value of 800 to 1,200.

Other circuit arangements may be used as taught in the Wiegand patent application, Serial No. 500,771, filed April 12, 1955, now Patent No. 2,926,313, and the Challacombe, et al. patent application, Serial No. 689,643, filed October 11, 1957, now Patent No. 2,959,747.

The device of FIGURES 1 to 5 is preferably operated on a full wave basis: that is, there are two essentially equal masses connected together by spring means, and each supported relative to a field structure by spring means in such fashion that an electrical impulse being produced by movement of one mass in one direction is concurrently effective to cause the other mass to move in the opposite direction. The masses thus vibrate toward and from one another at a rate determined by the total spring and mass system; and there is essentially no unbalanced force involved which tends to move the end pieces 10, 11, the casing 40, or the central magnet structure 12, 13, 14, because of the equal and opposite momentums of the two vibrating masses. Therewith the losses are very low, and an oscillator of high "Q" is provided.

Structurally, the individual springs are spaced from the magnet, and springs 30, 31 have their ends electrically insulated from one another and carry no electrical current during operation. The springs 22, 23, 28, 29, 30, 31 can be made of material selected for maintenance of elasticity effects over the operating temperature range. Even magnetizable material, such as the commercial alloy known by the trademark NiSpan-C, may be employed. The rings 16, 17 may be of a rigid insulating material, such as glass or a ceramic, and the spring ends may be appropriately secured thereto by cement or by the techniques of joining metal to glass or ceramic used in making lamp bulbs and vacuum tubes, wherewith changes of elasticity can be eliminated over normal ranges of operating temperature.

It will be understood that the external connections to the upper terminals 27 and the terminals 27a, as shown in FIGURE 6, are employed for maximum frequency and amplitude stability under conditions where the device may be subjected to variable temperatures; that operation can be effected by the two external connections 27 for each coil; and that the temperature responsive circuit of parts 45, 46 and the terminals 27a may be omitted.

The device illustrated in FIGURE 1, operated under full wave conditions, exemplifies the ability of a spring system to perform longitudinal vibrations at other than the basic or half-wave frequency at which parts of the spring move in the same direction at each stroke or half-cycle. The masses and electrical coils at the ends of a magnet, as one unit, may be duplicated to attain higher modes of vibration, with current deliveries. Thus, in FIGURE 8, a system having two axially aligned magnets 62a, 62b, with brass separators 66a, 66b, 66c, and four coil and mass groups 63a, 63b, 63c, 63d, are connected together by the sets of springs 64b, 64c, 64d, and connected to the end structures 65 by the shorter sets of springs 64a, 64e, to form a tandem system. Each coil and mass group can be made as in FIGURES 1-5, and the several coils connected alternately, e.g., with coils 63a, 63c, in one series and coils 63b, 63d in a second series; employing the upper illustrated spring sections for one series, and the lower spring sections for the second series. As before, the individual springs can be of the same wire composition and diameter, with the end coils having half the number of turns as the intermediate coils. Each set is illustrated as having two individual springs.

The spring system, of the series connected sets, has a basic or fundamental frequency in association with the masses; but by energizing coils 63a, 63c together, the movement of the masses is effective to produce two full waves compared to the production of a single full wave when two coil and mass groups are employed with a single magnet, and with spring systems totalling the same length and longitudinal yield per turn at the same loading.

Such a duplicated or multiplied system may be regarded as mathematically equivalent to a two-coil and single-magnet system of shorter length: and has the advantage of enabling a larger device to be made and used for such high frequencies.

The external terminals 67 of the upper springs can be connected to conductors 50, 52 of FIGURE 6, and the terminals 68 of the lower springs to conductors 53, 57.

Devices can be prepared from the illustrative standardized sizes of all parts except the springs, with the springs of material of a single wire and coil diameter, and the same turns spacing but varying in the numbers of turns present, for a range of frequencies, e.g., 380 to 420 cycles per second, with adjustment as described to a closely-maintained frequency within such range: and springs of other constants, e.g., of different wire and coil diameter and numbers of turns, can be employed with the other standardized parts to produce units for calibration to steady frequencies in other ranges.

It is obvious that the invention is not restricted to the illustrative form, and that it may be employed in many ways within the scope of the appended claims.

What is claimed is:

1. An electromotive vibrator and oscillator system comprising support members, a magnet positioned between the support members, an electrical coil surrounding the magnet for axial movement in the field at one pole thereof, coil spring means connecting the electrical coil to the support members for controlling the movement of the electrical coil, the axes of the coil springs being parallel to the axis of the magnet and the magnet being located between a pair of the coil springs, and conductor means connecting the electrical coil terminals with said spring means whereby current connection to the electrical coil can be effected at parts of the electrical coil springs connected to the support members.

2. An electromotive vibrator and oscillator system comprising support members, a magnet positioned between the support members, a mass including an electrical coil for movement in the field at one pole of the magnet, spring means connecting the mass to the support members, the axes of the springs being parallel to the axis of the magnet and the magnet being located between a pair of the springs, said mass and spring means constituting a mechanical vibratory system of predetermined frequency, and circuit means connected to said electrical coil for supplying current pulses thereto in synchronism with its movements, said spring means constituting a part of the circuit means.

3. A system as in claim 2, in which the mass includes a holder for a mass-varying member.

4. A system as in claim 2, in which the spring means include pairs of individual springs connected in parallel to one another and connected to the mass and extending from the mass toward respective end support members, at least two springs extending toward each end support member, and in which the springs extending in one direction from said mass are spaced at uniform radial distances from the axis of the magnet and at uniform peripheral distances from one another, and in which the springs extending from the mass in the other direction are connected thereto with uniform peripheral spacing between the connections thereto of the first-mentioned springs.

5. An electromotive vibrator and oscillator system comprising spaced end support members, a magnet positioned between the support members, a pair of masses located adjacent respective poles of the magnet and each including an electrical coil for movement in the magnetic field at the respective pole, said masses being movable along the magnet axis relative to one another and to the support members, conductive spring means spaced radially from the magnet axis and connecting the masses with the respective adjacent support member, intermediate spring means connecting the masses, and electrical connections from each coil to the conductive spring means, said conductive spring means being insulated from one another and extending to externally accessible terminals.

6. A system as in claim 5, including a casing joined to said end support member and sealed thereto for enclosing said masses, coils, and spring means, and a dry gas in said casing.

7. A system as in claim 5, in which at least one of said masses includes a holder and a mass-determining element on said holder.

8. A system as in claim 5, in which the conductive spring means includes a first pair of coil springs connected to one support member and to the adjacent mass at diametrically opposite points of said mass, and a second pair of coil springs connected to another support member and to the other mass at diametrically opposite points of said other mass; and the intermediate spring means includes a third pair of coil springs; the connections of the third pair of springs to the masses being in a radial plane at right angles to the radial plane through the connections of the first and second pairs to said masses.

9. An electromotive vibrator and oscillator system comprising a casing having sealed end closure members, a magnet between said closure members and nonmagnetic spacers for supporting the magnet relative to said closure members, two rings of insulating material surrounding the magnet and spacers and spaced from one another therealong, respective electrical coils secured to the said rings and providing therewith respective masses movable along the magnet and spacers; a first pair of electrically conductive coil springs mounted with their axes parallel to axis of the magnet and spacers and having axially extending ends, the inner ends being fixed to one of said rings and the outer ends extending insulatedly through the adjacent closure member and sealed fixedly thereto, the ends of the respective coil winding being electrically connected to the inner axially extending ends of the springs of the first pair; a second pair of electrically conductive coil springs mounted with their axes aligned with the coil springs of the first pair and having axially extending ends, the inner ends being fixed to the other ring and the outer ends extending insulatedly through the other closure member and sealed fixedly thereto, the ends of the other coil winding being electrically connected to the inner axially extending ends of the springs of the second pair; and a third pair of coil springs each having a yield under a given load equal to the yield under such load of any two axially aligned springs of the first and second pair, said springs of the third pair having ends fixedly secured to each ring at points thereof peripherally between the connections of the springs of the first and second pairs thereto.

10. An electromotive vibrator and oscillator system comprising end supports, a magnet between said end supports, two essentially identical and oppositely movable annular masses surrounding the magnet and respectively movable in the magnetic field at an end thereof, and spring means located outside the major path of magnetic flux and connected between the masses and between each mass and the adjacent end support, each mass including an electrical coil.

11. A system as in claim 10, in which the spring means include conductive end spring coils between each support and the adjacent mass, and in which the ends of each coil winding is connected to the inner ends of two adjacent end springs, and in which external terminals are connected to the outer ends of the said coil-connected end springs.

12. An electromotive vibrator and oscillator system comprising end supports, a magnet between the end supports, masses movable toward and from the respective end supports and spaced along the axis of the magnet, springs connecting each mass to the adjacent end support, and between the masses for connecting them, each mass including an electrical coil cooperative with the magnetic field, means controlled by one coil for supplying a pulse of electric current to the other coil to cause it to move in its magnetic field, and means for controlling the inertias of the respective masses.

13. An electromotive vibrator and oscillator system including support members, a magnet supported relative to the said end members and having its poles spaced therefrom along a magnet axis extending therebetween, two electrical coils surrounding said axis and movable therealong relatively to one another and to the support members between parts of the magnetic field of differing intensity, mass means and means for securing the same to the coils whereby the total mass of coils and mass means may be varied, spring means connecting the coils and masses, and pairs of coil springs for connecting the respective end members to the coils and mass means, the axes of the coil springs being parallel to the magnet axis.

14. An electromotive vibrator and oscillator system including support members, a magnet located between and connected to the support members with its poles spaced therefrom along the magnet axis, two electric coils each surrounding the magnet axis and respectively located adjacent a magnet pole, a fixed mass connected to the respective coils, means for attaching adjusting masses to a fixed mass, end spring means between each fixed mass and the adjacent support, and intermediate spring means between the masses, the spring means and masses providing a mechanical vibratory system having a frequency determined by the fixed and adjusting masses, and circuit means connected to said electric coils whereby electrical impulses generated in one electrical coil during its movement can be returned to the other electrical coil for maintaining the vibratory system in mechanical vibration.

15. An electromotive vibrator and oscillator system comprising spaced end support members, magnet means located between the support members and presenting a plurality of poles of opposite magnetic polarity spaced from one another and from the support members in the direction between the support members, a plurality of masses located for movement toward and from the support members, electrical coils surrounding the magnet means and each providing a part of said mass, and tensioned coil springs connecting the masses together and connecting the end masses to the support members whereby each electrical coil is positioned while at rest adjacent a said magnet pole, said coil springs and masses being effective to determine the rate of mechanical vibration of the electrical coils at the several modes of vibration, and means for supplying electrical current pulses to some of the electrical coils whereby half of the masses are caused to move in one direction while the other half are moving in the opposite direction.

16. A system as in claim 15, in which at least two north and two south poles are located in alternate succession between the support members, and at least two pairs of masses and electrical coils are provided, with one coil of each pair located adjacent a north pole and the other coil adjacent a south pole, and the coil spring means include a set of at least two coil springs between each two adjacent masses and between each end mass and the nearer support member, the coil springs of each set being spaced radially outside the magnet means.

References Cited in the file of this patent

UNITED STATES PATENTS

| | | |
|---|---|---|
| 2,286,897 | Costa et al. | June 16, 1942 |
| 2,557,080 | Dawson | June 19, 1951 |
| 2,926,313 | Wiegand | Feb. 23, 1960 |